May 6, 1969

A. J. HARKESS

3,442,369

SUSPENDED CONVEYOR

Filed May 22, 1967

Sheet _1_ of 6

INVENTOR
ANDREW J. HARKESS
BY John L. Boos
ATTORNEY

United States Patent Office 3,442,369
Patented May 6, 1969

3,442,369
SUSPENDED CONVEYOR
Andrew J. Harkess, Edgewater, N.J., assignor to Hewitt-Robins Incorporated, Stamford, Conn.
Filed May 22, 1967, Ser. No. 640,083
Int. Cl. B65g 15/00
U.S. Cl. 198—184     9 Claims

ABSTRACT OF THE DISCLOSURE

This invention relates to a suspended belt conveyor system in which the conveyor belt is formed into a substantially tubular-shaped member when loaded with material to be conveyed and which is opened into an inverted U-shaped trough when the conveyor belt is unloaded.

BACKGROUND OF THE INVENTION

This invention relates to a suspended conveyor system and more particularly to a suspended endless conveyor belt having an overlapping edge closure design and loading stations for manipulating the belt.

The conventional troughed belt conveyor system is severely limited when loads are to be carried around curves because the conveyor belt is both the tension member for transmitting the driving force and the load carrying member. In order to convey loads through a winding path it is therefore necessary to provide a number of relatively short lengths of conveyor sections arranged in series. This in turn requires a separate transfer station at the discharge end of each conveyor section and these numerous transfers of material can pose a serious material degradation problem when handling a fragile material such as iron ore pellets. The numerous material transfers can also create a dust and noise problem. In addition, the high frequency of loading short conventional conveyors arranged in series can create a serious belt wear problem by the abrasive action of the material falling onto the belt. Furthermore, the troughed conveyor belt carries the material exposed to the atmosphere and separate enclosing structures are required if the conveyed material is sensitive to moisture or when it is desired to protect material being conveyed overland.

Prior art systems have sought to eliminate some of the above described problems by suspending the conveyor belt in a generally U-shaped trough and providing a separate tension member for moving the conveyor belt. This type of system has heretofore proven extremely difficult to unload and still requires a separate protective housing if the conveyed material is to be protected. Still other prior art systems have tried to overcome the above described problems by suspending a movable tubular conveyor belt having interlocking means, such as a zipper mechanism, formed along its entire length. The interlocking means are generally adapted to be opened at any given section of the belt as that portion of the moving belt passes over a loading or unloading station and is closed again after that portion of the tube passes beyond the station. In addition to the basic problem that this type of system is not designed to carry exceptionally heavy loads, there are the problems of the expense in forming the interlocking means on the belt edges, the rapid wear of the interlocking means and the cleaning of the interlocking means.

SUMMARY OF THE INVENTION

According to the present invention both the problems of the conventional troughed conveyor belt system and the prior art suspended conveyor belt systems are overcome by suspending a movable tubular conveyor belt having an overlapping edge closure design. One or more loading and unloading stations are provided which unfolds the belt for receiving or discharging material and then refolds the belt as it leaves the station. The unloading station is specifically designed to flex the conveyor belt into a reverse trough so as to ensure a complete discharge of the material from the belt.

Accordingly, one of the objects of the present invention is to provide a suspended conveyor for conveying bulk material over irregular terrain and/or through a winding path with a minimum of transfer stations.

Another object is to provide a suspended endless belt conveyor for conveying fragile palletized material.

Still another object of the present invention is to provide a suspended endless belt conveyor in which the edge portions of the belt are adapted to be folded over the material being conveyed on the central portion of the belt.

A further object of the invention is to provide a loading and unloading station for a suspended belt conveyor system.

Still a further object is to provide a suspended endless belt conveyor in which the edge portions of the belt are adapted to be folded over the material being conveyed and in which a loading and unloading station is provided that first unfolds and then re-folds the belt.

BRIEF DESCRIPTION OF THE DRAWING

Other objects, advantages and novel features of the present invention will become apparent from the following detailed description of the invention when considered in conjunction with the accompanying drawings wherein.

DESCRIPTION OF THE PREFERRED EMBODIMENT

Figures 1A, 5:
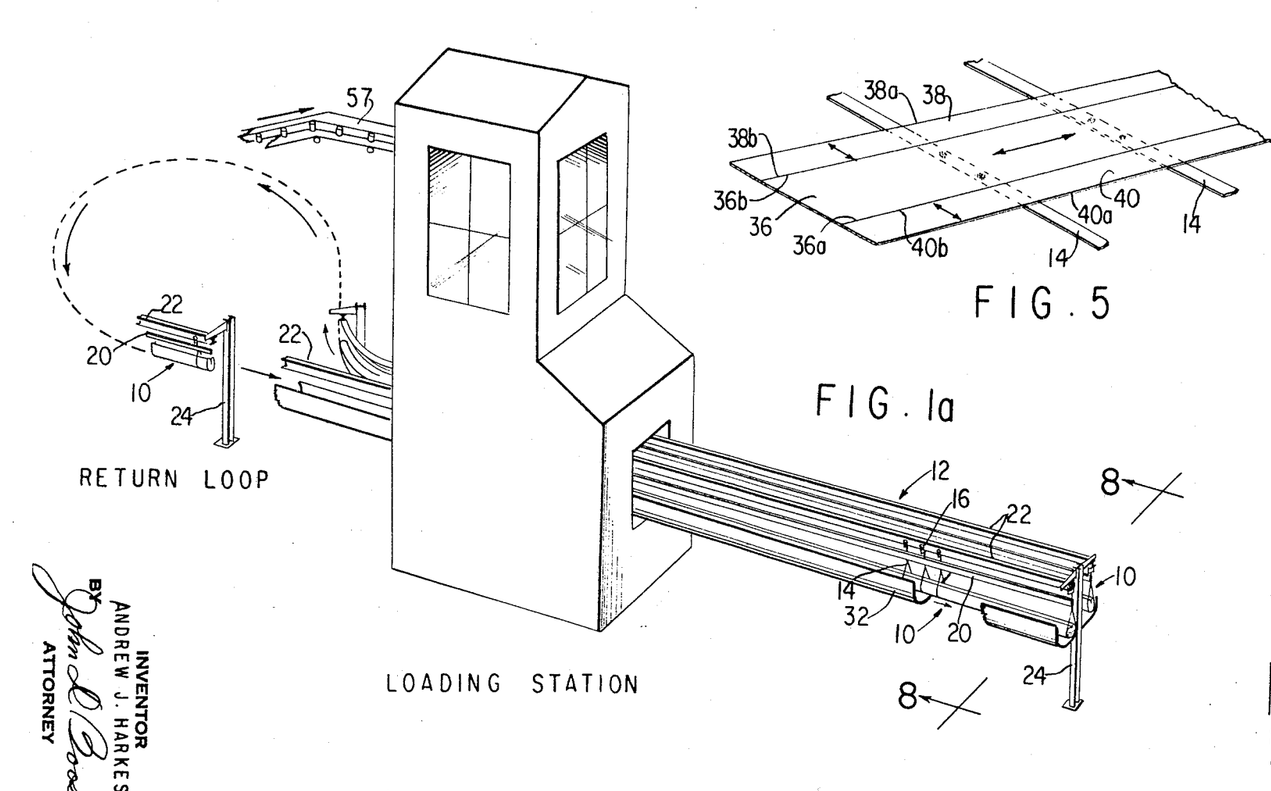
FIG. 1a is a perspective view, with parts broken away and parts omitted, of a section of the suspended conveyor system of the present invention showing a loading station and the path of the conveyor belt in moving through a return loop.
FIG. 5 is a perspective view of a section of a conveyor belt in the unfolded position.
Figure 1B:
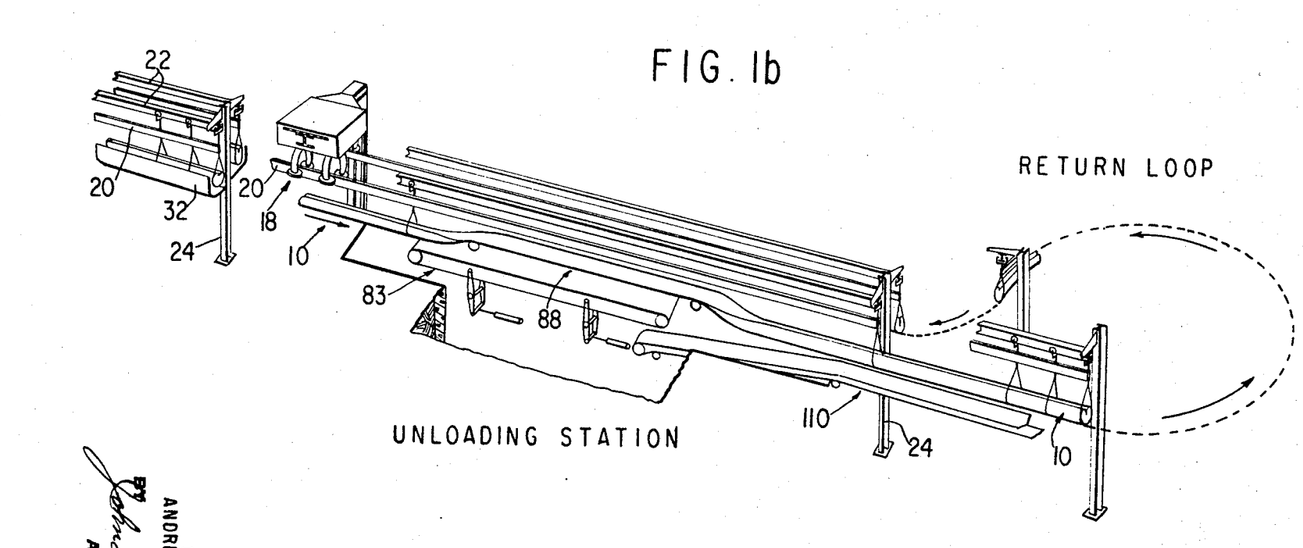
FIG. 1b is a perspective view similar to FIG. 1a and showing an unloading station and the path of the conveyor belt in moving through another return loop.

Referring to FIGS. 1a and 1b, the endless conveyor belt 10 is suspended from an overhead closed loop track system 12 by a plurality of spaced apart supporting slings 14 connected to trolleys 16 that ride on the track system.

A tension member 20 in the form of an endless friction belt interconnects the trolleys and one or more drive means 18 frictionally engages the tension member in order to thereby drive both the tension member and the suspended conveyor belt 10 through the closed loop.

Figures 2, 5A:
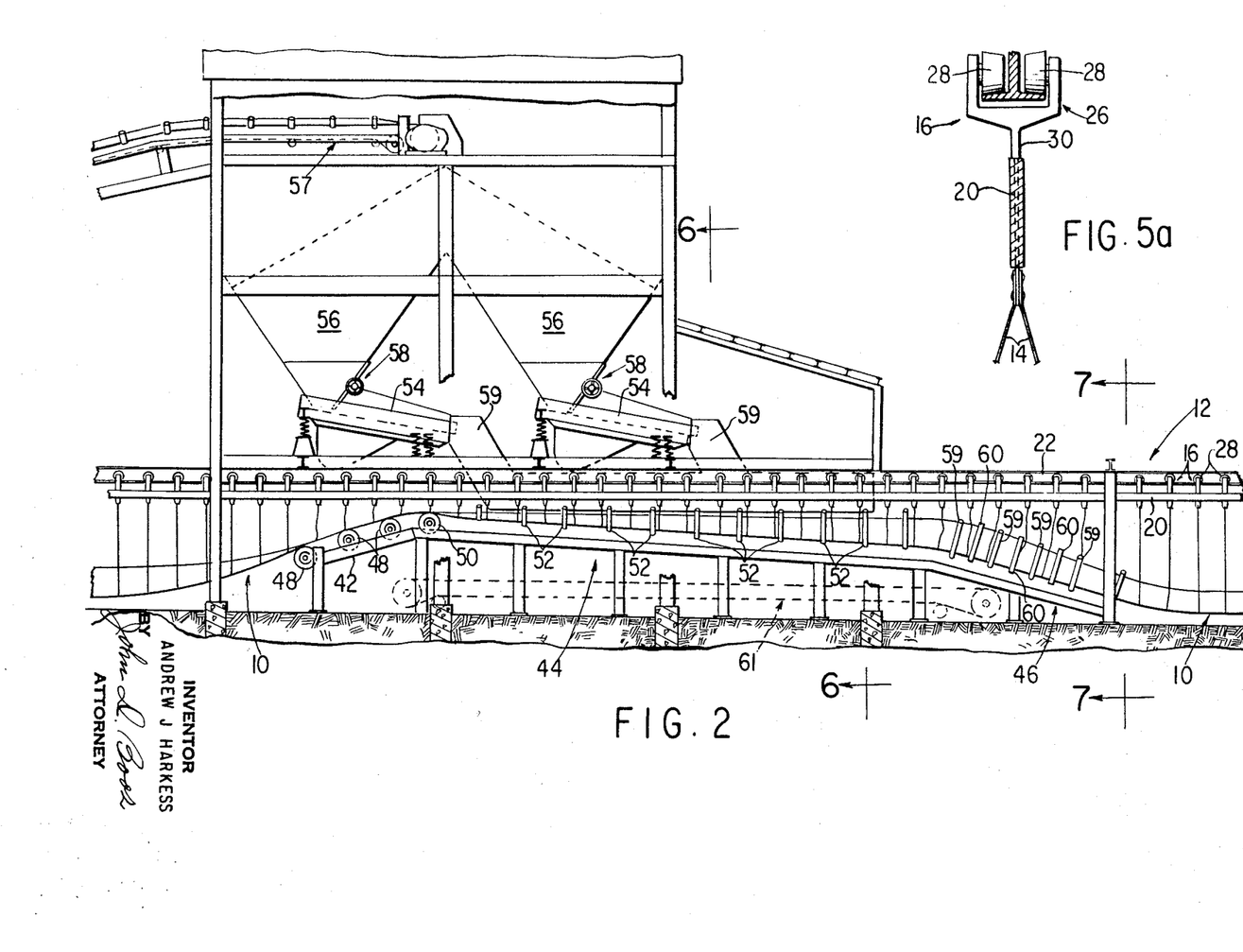
FIG. 2 is a side view, with parts omitted, showing the conveyor belt moving through the loading station.
FIG. 5a is an end view of one of the suspended trolleys.
Figures 8, 9:
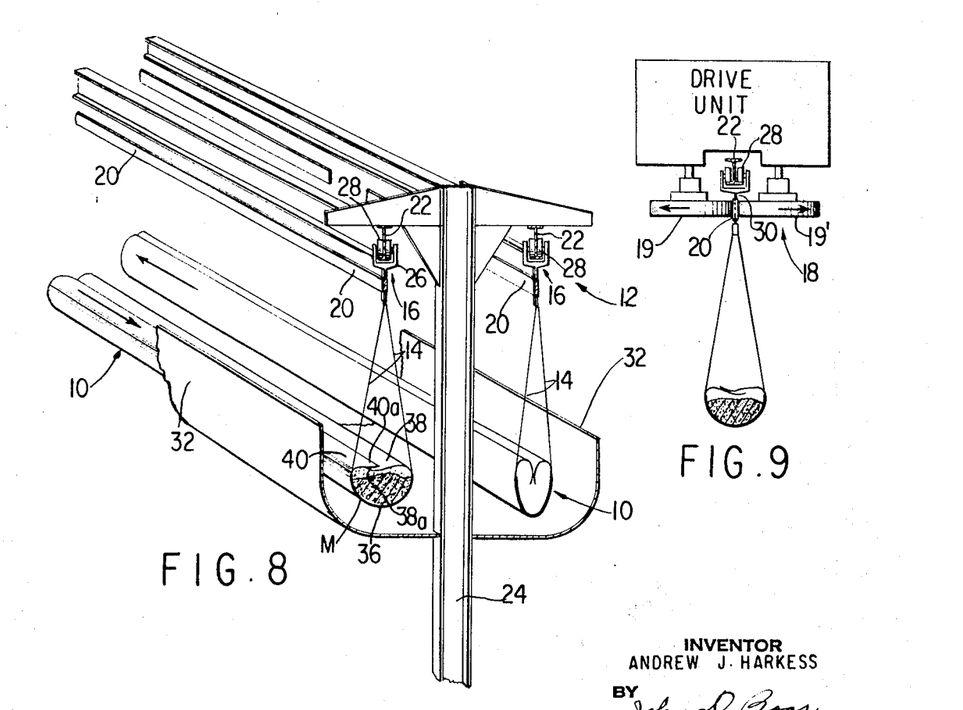
FIG. 8 is a perspective view, with parts broken away, of a length of the conveyor system.
FIG. 9 is a cross-sectional view of a section of the loaded conveyor showing a typical drive section.
Figure 10:
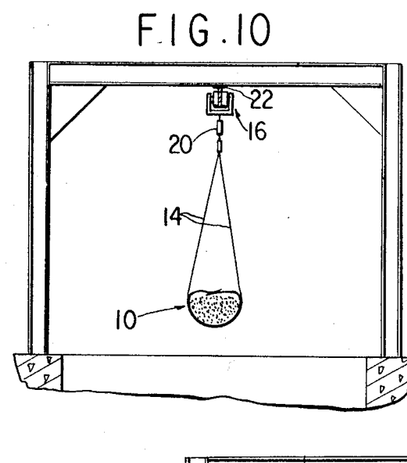
FIG. 10 is a view taken along line 10—10 of FIG. 3.
Figure 11:
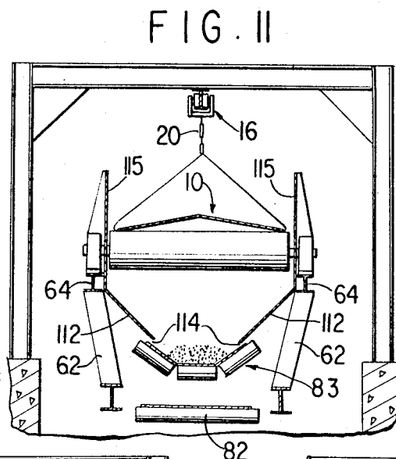
FIG. 11 is a view taken along line 11—11 of FIG. 3.
Figure 12:
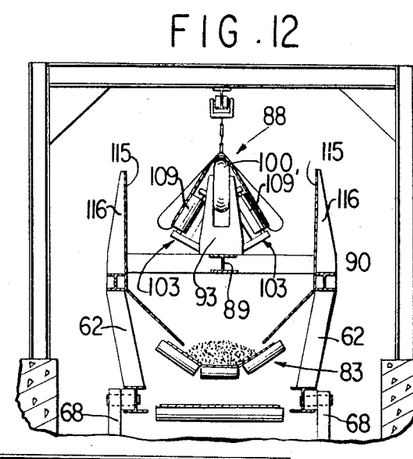
FIG. 12 is a view taken along line 12—12 of FIG. 3.
Figure 13:
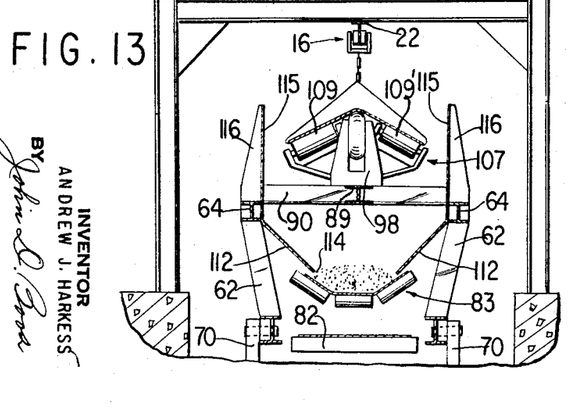
FIG. 13 is a view taken along line 13—13 of FIG. 3.
Figure 14:
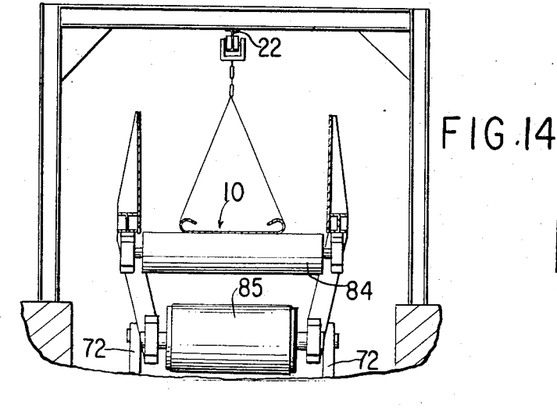
FIG. 14 is a view taken along line 14—14 of FIG. 3.

The overhead track system 12 consists of standard rolled steel I beam sections 22 supported from spaced apart tower structures 24. It will be apparent that the track system could also be readily supported from the ceiling of a factory, or the like, and that any monorail track system could be employed. The trolleys 16 are made up of brackets 26 having spaced apart wheels 28 that are adapted to ride on the lower flanges of the rails, as shown in FIG. 5a. The endless friction belt 20 is attached to the central web portion 30 of each trolley bracket so that the trolleys and friction belt make up a traveling means which is adapted to travel along the track system. Suspended from one or more of the tower structures are drive units 18, as shown in FIG. 9, which have powered driver elements 19, 19' which are forced into frictional contact with opposite sides of the belt 20 and which drive elements are driven in opposite directions. The drive elements are, for example, conventional pneumatic tires. While only one drive unit is shown in FIGS. 1a and 1b, it will be recognized that ordinarily a plurality of such units would drive the system and that the exact number and location of such units will be dependent upon such factors as the maximum load and the distance that the bulk material is to be conveyed.

In outdoor overland conveyor systems a trough-shaped windshield 32 extends between the spaced tower structures, with the bottom of the trough located directly under the suspended conveyor belt. The side walls of the shield extend vertically upward above the suspended conveyor so as to prevent any cross winds from affecting or creating excessive swing in the belt.

The endless conveyor belt 10 is supported by flexible slings 14 extending under the conveyor belt and having both ends attached to the lower ends of the overhead trolleys. The flexible slings are cables or straps, for example, and support the center section of the conveyor belt.

The conveyor belt 10 is formed with a central load carrying section 36 and with edge flaps 38, 40 formed integral with the longitudinal sides 36a, 36b of the center section 36, as seen in FIG. 5. The center section is formed with sufficient longitudinal stiffness so that the belt sections between the slings will not excessively bow or stretch under maximum loads. The edge flaps of the belt are, on the other hand, formed with sufficient lateral stiffness so as to be formed into longitudinal flaps or covers extending along either side of the center section. The longitudinal junction of edges 38b, 40b of the edge flaps to edges 36b, 36a of the center section respectively are formed with sufficient lateral flexibility so as to permit the edge flaps 38, 40 to be folded over the center section of the conveyor belt. Conventional belt forming and belt reinforcing techniques, well known in the art, are employed in manufacturing the conveyor belt and form no part of the present invention.

When the conveyor belt is suspended in a loaded condition, as seen on the left hand section of the conveyor in FIG. 8, the center section of the belt is formed into a substantially U-shaped trough with the edge flaps 38, 40 folded over the material on the center section of the belt. One longitudinal edge section 40a overlaps the other longitudinal edge section 38a so as to form the conveyor belt into a substantially tubular shaped member. When, on the other hand, the conveyor belt is suspended in an unloaded condition, as righthand conveyor section in FIG. 8, the conveyor belt tends to fold longituidnally along the center of the center section and, in this manner, the center section is formed into a U-shaped trough which is narrower than the U-shaped trough which is formed when the conveyor belt is loaded.

Figure 6:
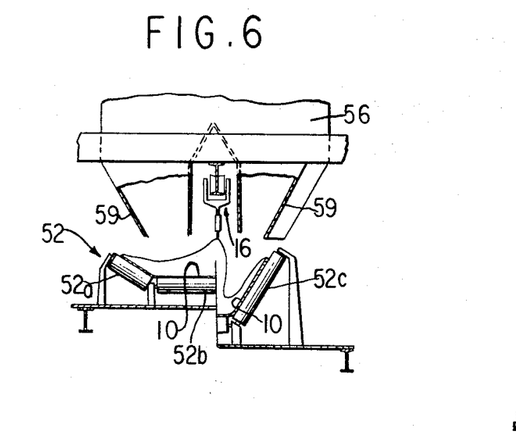
FIG. 6 is a view taken along line 6—6 of FIG. 2 showing the conveyor belt at two different locations in the loading station.

The loading station is made up of three successive sections of spaced apart idler rolls or idler roll assemblies mounted on ramp structures 42, 44, 46. As the suspended conveyor belt approaches the general loading area the belt first moves over three spaced apart unfolding rolls 48 which are mounted between the side rails of the upwardly inclined first ramp 42. The rolls serve to release the tension in the supporting slings 14 and, at the same time, to unfold the edge flaps 38, 40 of the belt. Thus, the conveyor belt enters the loading area on the second ramp 44 in a flattened condition. The conveyor belt then passes over a fourth unfolding roll 50 at the top of the loading ramp 44 and proceeds down a slight incline over a series of troughing roll assemblies 52. Each troughing roll assembly has two side rolls 52a, 52c and a center roll 52b as shown in FIG. 6. Both the fourth unfolding roll and the troughing roll assemblies are mounted between spaced rails of ramp 44 in substantially the same manner as in mounting the rolls on the first ramp 42. The angle of inclination for the side idler rolls 52a, 52c is a minimum for the troughing roll assembly at the top of ramp 44 and the angles of inclination for each subsequent troughing roll is made progressively larger so that the flat conveyor belt is gradually formed into a deep trough as it proceeds through the loading area. This change of side idler roll inclination is illustrated in FIG. 6 where the lefthand and righthand portions of the figure correspond to idler assemblies on the upper and lower sections respectively of ramp 44.

Figure 7:
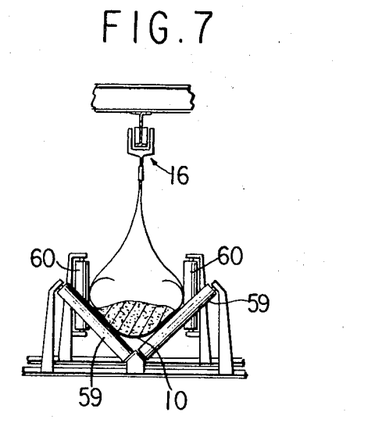
FIG. 7 is a view taken along line 7—7 of FIG 2.

Directly over the troughing roll assemblies are one or more vibrating feeders 54 of one or more storage bins or hoppers 56 which are filled by conveyor 57. Control gates 58 control the flow of material from the hoppers onto the vibrating feeders. The material discharged from the loading bin is guided by chutes 59 as it falls on the central portion 36 of the belt. The fully loaded conveyor passes from the last roller assembly on the second ramp to a series of spaced apart V idler roll assemblies 59 on the third ramp 46. The roll assemblies 59 gradually lowers the loaded belt so as to allow the slings to once again support the loaded belt during the conveyance of the load to the unloading station. Mounted on the side rails between each of the spaced apart V idler roll assemblies are vertical rolls 60, as shown in FIG. 7, which contact and urge the edge flaps of the belt over into a folded position covering the material loaded on the central portion of the belt. If desired a collecting conveyor 61 can be positioned under the loading station so as to collect any spillage.

Figure 3:
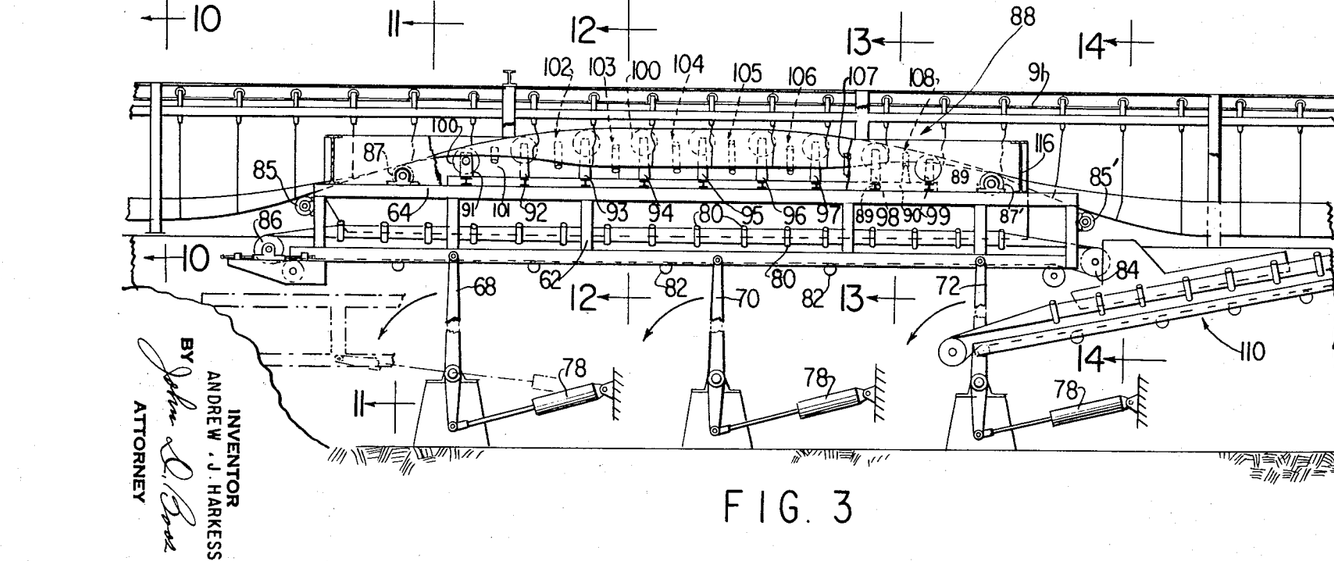
FIG. 3 is a side view, with parts omitted, showing the conveyor belt moving through the unloading station.
Figure 4:
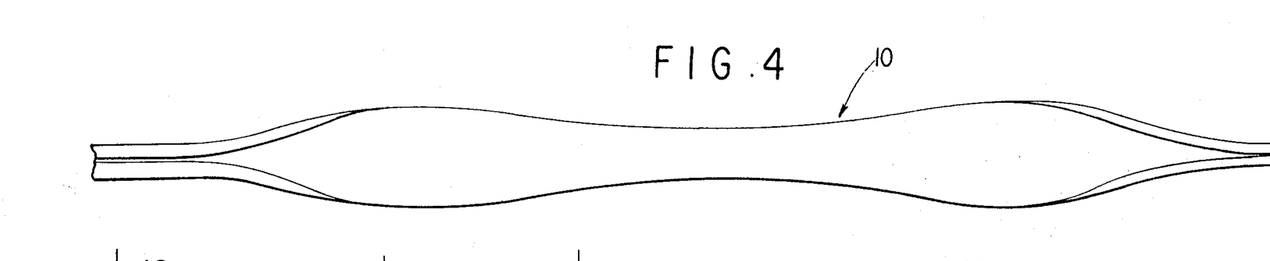
FIG. 4 is a top view of the conveyor belt as it moves through the unloading station.

The support structure for the unloading station comprises support members 62 connecting the upper parallel spaced apart side rails 64 with the lower parallel spaced apart side rails 66. Pivotally connected to each of the lower side rails are three arms 68, 70, 72. The opposite ends of each arm are rotatably mounted on a fixed base or support 74. Hydraulic means 78 are coupled to the actuating levers so that the entire support structure can be oscillated approximately 90° between the operative position shown in FIG. 3 and the inoperative position shown by the phantom lines in the lefthand side of FIG. 3. In this manner more than one unloading station can be located at various discharge points along the path of the conveyor and the material can be selectively discharged at any of these locations by simply raising the particular unloading station into the operative position. The lower side rails 64 serve as the side supports for the troughing idler assemblies 80 and the return idler assemblies 82 in the collecting conveyor 83. The powered head pulley 84 and the tail pulley 86 are mounted in bearing structures which are also attached at the opposite ends of the spaced lower side rails. Mounted between the spaced support members at each end of the frame are straight rolls 85, 85' similar to the unfolding rolls at the loading station. Similar straight rolls 87, 87' are mounted between the upper spaced side rails at approximately equal distances from each end.

The discharge means 88 is mounted between the upper side rails 64 on a support structure made up of spaced cross beams 90 and center beam sections 89 extending between the cross beams. A series of center roll supports 91, 92, 93, 94, 95, 96, 97, 98 99 are mounted at the center of each transverse beam and a center roll 100 is rotatably mounted from each support. The center rolls associated with support 91, 92 and 93 guide the center section of the conveyor belt from the unfolding straight rolls up a slight incline to an elevated horizontal path formed by the center rolls associated with supports 94, 95, 96. The center rolls associated with supports 97, 98, 99 gradually lower the belt from the elevated horizontal path back to the flat roll 87'. Thus, the center rolls associated with supports 91, 92, and 93 and 99, 98, 97 are rotatably mounted at progressively greater distances above the transverse members 90 and the supports 94, 95, 96 are formed so as to rotatably mount their center rolls at a substantially uniform height above the tranverse members.

Mounted on the center beam sections 89 between the center roll assemblies are side roll assemblies 101, 102, 103, 104, 105, 106, 107, 108. Each side roll assembly comprises two rolls 109, 109' rotatably mounted so that their axes of rotation intersect so as to form an inverted V. The angle included between the intersecting axes of the side rolls is a maximum for assembly 101 and the angle for each succeeding assembly is gradually decreased to the minimum angle for assemblies 104, 105 and then the included angle of the axes is progressively increased for assemblies 106, 107, 108 until assembly 108 has an angle which is substantially equal to the included angle of the axes for assembly 101. It will be recognized that as the belt is gradually raised by the center rolls on assemblies 91, 92, 93, the sides of the belt are gradually lowered onto the side rolls of assemblies 101, 102, 103 by the weight of the conveyed material. With the belt formed into this inverted trough position the load carried by the belt is discharged past both longitudinal edges 38a, 40a of the conveyor belt and onto conveyor 83 which, in turn, discharges the material onto conveyor 110. The material can then, for example, be conveyed via conveyor 110 to a loading or storage area or to a location where the conveyed material is to be used. The flexing of the conveyor belt, which results when the belt is formed into an inverted trough position, tends to dislodge any of the conveyed material that might stick to the surface of the belt. This inverted trough position is maintained as the belt passes over roll assemblies 104, 105 and the conveyor belt is then gradually lowered into a suspended condition as it passes over roll assemblies 106–108, 97–99 and over straight rolls 87', 85'. Mounted between side rails 64 is an open ended unloading trough extending the entire length of the structure and with the bottom plates 112 of the trough defining a longitudinal slot 114 opening directly over the belt of the discharge conveyor. Side walls 115 of the trough extend vertically upwardly above rails 64 and are supported by vertical supports 116. The conveyed material is discharged from the conveyor belt 10 within the confines of the trough and guides the material onto the dscharge conveyor 83 below. It will also be apparent that the vertical side walls of the trough prevent any wind or air currents from disturbing the belt or the material being discharged from the belt.

In operation, the conveyor belt is normally suspended from trolleys 16 by slings 14 and it is driven through a separate tension member 20 by drive means 18. The suspended conveyor belt is thus only a load carrying member except for those short sections of the belt which are supported by the idler roll assemblies at the loading and unloading stations. The length of the supported sections, however, are sufficiently short so that the tension transmitted in the conveyor belt will not inhibit the flexibility of the conveyor belt. It is therefore possible to have the loaded conveyor belt move through a winding path between the loading station (FIG. 1a) and the unloading station (FIG. 1b). After a section of the conveyor belt passes through the unloading area, it moves through a return loop, shown diagrammatically in FIG. 1b, and returns to the loading area where it again moves through a return loop (FIG. 1a) and then again passes through the loading station.

It will be recognized that the above described conveyor system provides a means for conveying a fragile material through a winding path without requiring several transfers onto separate conveyors. The overlapping edge design of the conveyor belt protects the material being conveyed during transit and, at the same time, obviates many of the problems encountered with the suspended tubular "zipper" belt conveyors. The loading and unloading stations are provided for use in combination with the conveyor belt and which stations are adapted to unfold and refold the conveyor belt. The unloading station forms the conveyor belt into an inverted trough and thereby flexes the belt in order to ensure a complete discharge of the conveyed material.

Obviously many modifications and variations of the present invention are possible in light of the above teaching. It is therefore to be understood that within the scope of the appended claims the invention may be practiced otherwise than as specifically described.

What is claimed is:

1. A conveyor comprising a loading station, an unloading station, a rail extending between said loading station and said unloading station, a flexible conveyor belt having longitudinal extending edges, means movably supporting said conveyor belt beneath said rail for moving said conveyor belt between said loading station and said unloading station, said conveyor belt normally being loaded at said loading station with material that is to be conveyed and which material is then discharged from said conveyor belt at said unloading station, said conveyor belt being formed into a substantially tubular cross sectional shape when conveying material between said loading station and said unloading station, said unloading station having discharge means forming said conveyor belt into a reverse trough in said unloading station whereby material conveyed by said conveyor belt is discharged past both of said longitudinal extending edges.

2. The conveyor system described in claim 1 wherein said discharge means can be positioned in the normal path of travel of said conveyor belt so that said conveyor belt rides over and is supported by said discharge means in said unloading station.

3. The conveyor system described in claim 2 wherein said discharge means comprises a series of center rolls which support the center of said conveyor belt and a series of side rolls which support the sides of said conveyor belt, said side rolls located on either side of said center roll and inclining downwardly from said center rolls whereby the section of the conveyor belt passing over said discharge means is formed into the form of a reverse trough.

4. The conveyor system described in claim 1 wherein said tubular cross sectional shape of said conveyor belt is formed with said longitudinal edges of said belt being disposed in overlapping relation to each other and wherein said discharge means comprises a series of idler roll means positioned in the normal path of travel of said conveyor belt which unfolds the longitudinal extending edges of the section of said conveyor belt moving over said idler roll means and which supports the section of said conveyor belt in the form of a reverse trough whereby the material conveyed by the section of said conveyor belt is discharged past both said longitudinal edges.

5. The conveyor system described in claim 4 wherein said idler roll means comprises a first series of straight rolls which unfold said longitudinal extending edges of said conveyor belt, a second series of idler rolls which support said conveyor belt in the form of a reverse trough and a third series of straight rolls which lower said conveyor belt to allow said conveyor belt to again be suspended from said movable support means.

6. The conveyor system described in claim 5 which is further characterized by an actuating means coupled to said unloading station whereby said unloading station can be selectively moved between an active and an inactive position, said unloading station in said inactive position not contacting said conveyor belt, said unloading station in said active position positioning said idler roll means in the path of travel of said conveyor belt.

7. The conveyor system described in claim 1 wherein said loading station comprises a series of roll assembly means for unfolding said longitudinal edges and supporting said conveyor belt so that it faces upwardly for receiving material to be conveyed and then refolding one said longitudinal edge over the other said longitudinal edge.

8. The conveyor system described in claim 7 wherein said roll assembly means includes one or more substantially vertical rolls located on either side of said conveyor belt which contacts the sides of said conveyor belts and urges one of said longitudinal edges over the other of said longitudinal edges.

9. The conveyor system described in claim 1 wherein said conveyor belt comprises a longitudinal center section and longitudinal edge flaps formed integrally with either side of said center section, said edge flaps folding over the conveyed material being supported by said center section of said belt.

References Cited

FOREIGN PATENTS

| | | |
|---|---|---|
| 975,464 | 11/1961 | Germany. |
| 1,229,449 | 11/1966 | Germany. |

RICHARD E. AEGERTER, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,442,369

May 6, 1969

Andrew J. Harkess

It is certified that error appears in the above identified patent and that said Letters Patent are hereby corrected as shown below:

Column 1, line 22, after "ing" insert -- and unloading --.
Column 5, line 4, after "98" insert -- , --.

Signed and sealed this 23rd day of June 1970.

(SEAL)
Attest:

Edward M. Fletcher, Jr.
Attesting Officer

WILLIAM E. SCHUYLER, JR.
Commissioner of Patents